United States Patent [19]

Giragosian

[11] 3,986,688

[45] Oct. 19, 1976

[54] VARIABLE EFFECTIVENESS STABILIZING/CONTROLLING SURFACE

[75] Inventor: Pakrad A. Giragosian, Centerville, Ohio

[73] Assignee: The United States of America as represented by the Secretary of the Air Force, Washington, D.C.

[22] Filed: June 16, 1975

[21] Appl. No.: 587,489

[52] U.S. Cl. .......................... 244/42 DC; 244/43; 244/113
[51] Int. Cl.² ........................................ B64C 3/48
[58] Field of Search ....... 244/7, 40 R, 42 D, 42 DA, 244/42 DC, 43, 44, 113

[56] References Cited
UNITED STATES PATENTS

| | | | |
|---|---|---|---|
| 1,854,444 | 4/1932 | Barnhart | 244/42 DC |
| 1,880,019 | 9/1932 | Harper | 244/44 |
| 2,223,335 | 11/1940 | Stewart | 244/44 |
| 2,384,933 | 9/1945 | Lee | 244/44 |
| 2,837,300 | 6/1958 | Sullivan | 244/7 B |
| 3,067,971 | 12/1962 | Dew | 244/113 |

FOREIGN PATENTS OR APPLICATIONS 559,752  3/1944  United Kingdom .............. 24/42 DA

OTHER PUBLICATIONS

"A Primer of Sonic Aerodynamics," *Aviation Week*, R. McLarren, pp. 21,22,24, Aug. 16, 1948.

NACA Tech Note 1179, "Notes on the Theoretical Characteristics of Two-dimensional Supersonic Airfoils," Jan. 1947.

*Primary Examiner*—Stephen G. Kunin
*Assistant Examiner*—Galen L. Barefoot
*Attorney, Agent, or Firm*—Joseph E. Rusz; Arthur R. Parker

[57] ABSTRACT

A wedge-shaped, high speed airfoil having a variable geometry configuration consisting of separate, upper and lower airfoil surfaces individually and/or collectively adjustable between inner, retracted and outer, extended positions to vary the amount of airfoil surface area exposed to the free stream flow to that required for effective aircraft stabilization and/or control at selected Mach numbers while minimizing the drag and aerodynamic heating normally resulting therefrom.

1 Claim, 4 Drawing Figures

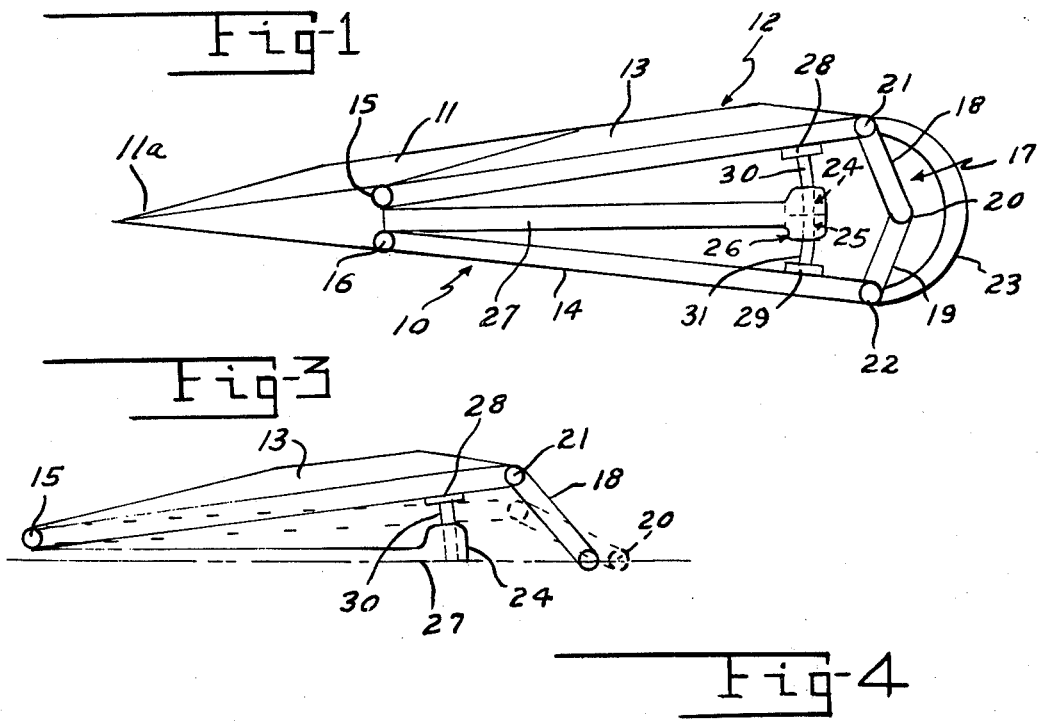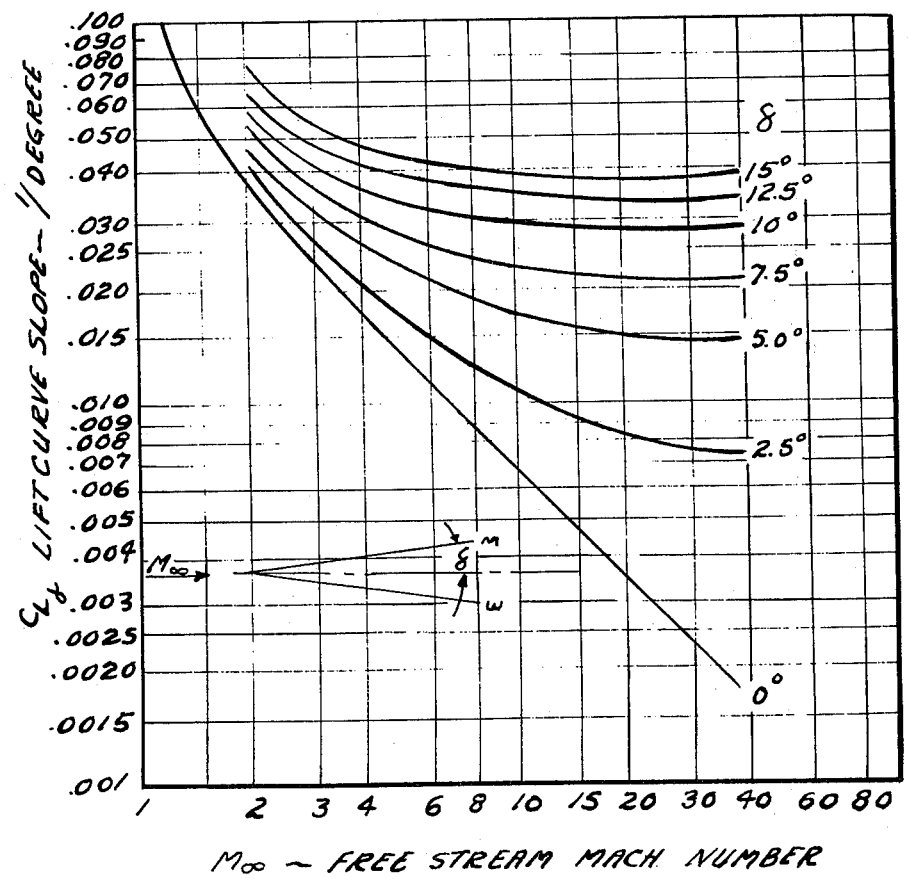

VARIABLE EFFECTIVENESS STABILIZING/CONTROLLING SURFACE

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of airfoil surfaces and, in particular, to an in-flight, variable geometry and wedge-shaped airfoil utilizable as a control and/or stabilizing surface on high speed aircraft.

In supersonic flight, a fundamental problem is the decay of the lift-curve slope with increasing Mach number. The wedge-shaped airfoil, in current use on certain high speed aircraft, has previously provided significant increases in the said lift-curve slope at low angles of attack and at supersonic Mach numbers. The present invention makes use of the wedge-shaped airfoil by adding a unique and yet simplified variable geometry configuration thereto whereby the airfoil is divided into separate upper and lower airfoil surfaces pivotally mounted at their forward ends for adjustment either individually or in concert between outer or inner positions to thereby control the amount of surface area exposure to the free stream flow to the minimum consistent with effective lift and affording reduced drag and aerodynamic heating. Although the broad concept of airfoils having separate upper and lower "trailing edge" surfaces adjustable between inner and outer positions has been previously developed as is illustrated, for example, in FIG. 25 of a U.S. Pat. No. 1,854,444, issued Apr. 19, 1932 to G. E. Barnhart, it is obvious from an examination of said patent that what appears, at first glance, to be a similar device is actually an arrangement involving a different principle of operation in that by the outward movement of the Barnhart trailing edge surfaces at 6 and 41 to their extended relation, a higher pressure distribution over the said surfaces is thereby generated. Moreover, the retracted position of the Barnhart trailing edge surfaces 6 and 41 is actually the normal streamlined position. On the other hand, the novelty of the present invention resides, first, in its combination with the high speed wedge-shaped airfoil, secondly, the application of the separated relation between the upper and lower airfoil surfaces of the inventive arrangement to all or substantially all of the entire airfoil, unlike the application of the separated airfoil surfaces 6 and 41 (FIG. 25) of Barnhart to the trailing edge only, to thereby provide a positive control of the pressure distribution over the entire airfoil, and lastly and, perhaps, most importantly, the pivotally mounted and separate airfoil surfaces of the present invention are adjustable to a retracted position further inwardly of the normal streamlined position, unlike Barnhart, to be thereby shielded from and thus expose less surface area to the free stream flow for providing reduced drag and aerodynamic heating at the retracted surface, as will appear self-evident hereinafter in the following summary and detailed description.

SUMMARY OF THE INVENTION

The present invention is an in-flight, variable geometry and wedge-shaped airfoil utilizable as a high speed stabilizer, control and/or trim device, and/or as a lifting surface for, in particular, supersonic and hypersonic aircraft, spacecraft and other vehicles. It comprises principally of a relatively short, solid leading edge segment and a relatively long, main airfoil-hollow segment having separate, upper and lower flat airfoil surfaces respectively hinged to the leading edge segment. Hydraulically-actuator or other suitable operating means may be used to individually or collectively adjust the hingedly-mounted upper and lower airfoil surfaces between retracted or extended positions to thereby vary the wedge angle therebetween or, in other words, specifically control the amount of airfoil surface area that is to be exposed to the free stream flow and which is most compatible with the particular Mach number at which the high speed aircraft or other vehicle incorporating the inventive device may be traveling.

A cantilever beam, mounted within the hollow portion of the airfoil along the longitudinal axis thereof, may incorporate a pair of independently operable, hydraulic actuators on the outer end thereof adjacent or substantially adjacent the aft end/trailing edge portion of the said airfoil. A separate push-pull rod may be interconnected in a conventional manner between a respective hydraulic actuator and the hingedly-mounted, upper and lower airfoil surfaces for adjusting the corresponding airfoil surface between the aforementioned retracted and extended positions, either separately or collectively inwardly or outwardly relative to each other. To complete the present assembly, the aft ends of the upper and lower airfoil surfaces are hingedly interconnected to each other in order to specifically provide both for a unified and stable device and to positively control the inward, retracted and outward, extended movements of said upper and lower airfoil surfaces. A flexible-type base cover element, preferably of an arcuate configuration and also interconnected between the rear ends of the upper and lower airfoil surfaces, may be used to enclose the aft end of the present airfoil and, in effect, form the trailing edge thereof.

Other objects and advantages of the invention will readily appear hereinafter in connection with the following disclosure, taken in connection with the accompanying drawings, in which:

BRIEF DESCRIPTION OF THE DRAWINGS

FIG. 1 is a partly schematic and diagrammatic representation of the overall assembly of a high speed, transonic, supersonic or hypersonic airfoil embodying the new and improved variable geometry and wedge-shaped configuration of the present invention;

FIG. 3 is a second partly schematic and diagrammatic view more clearly depicting the angular adjustment of the upper airfoil surface portion of the overall airfoil assembly of FIG. 1; and FIG. 4 is another graph illustrating a plot of the variation between the lift-curve slope and Mach number for various wedge angles to which the inventive airfoil may be adjusted.

DESCRIPTION OF THE PREFERRED EMBODIMENT

Figure 2:
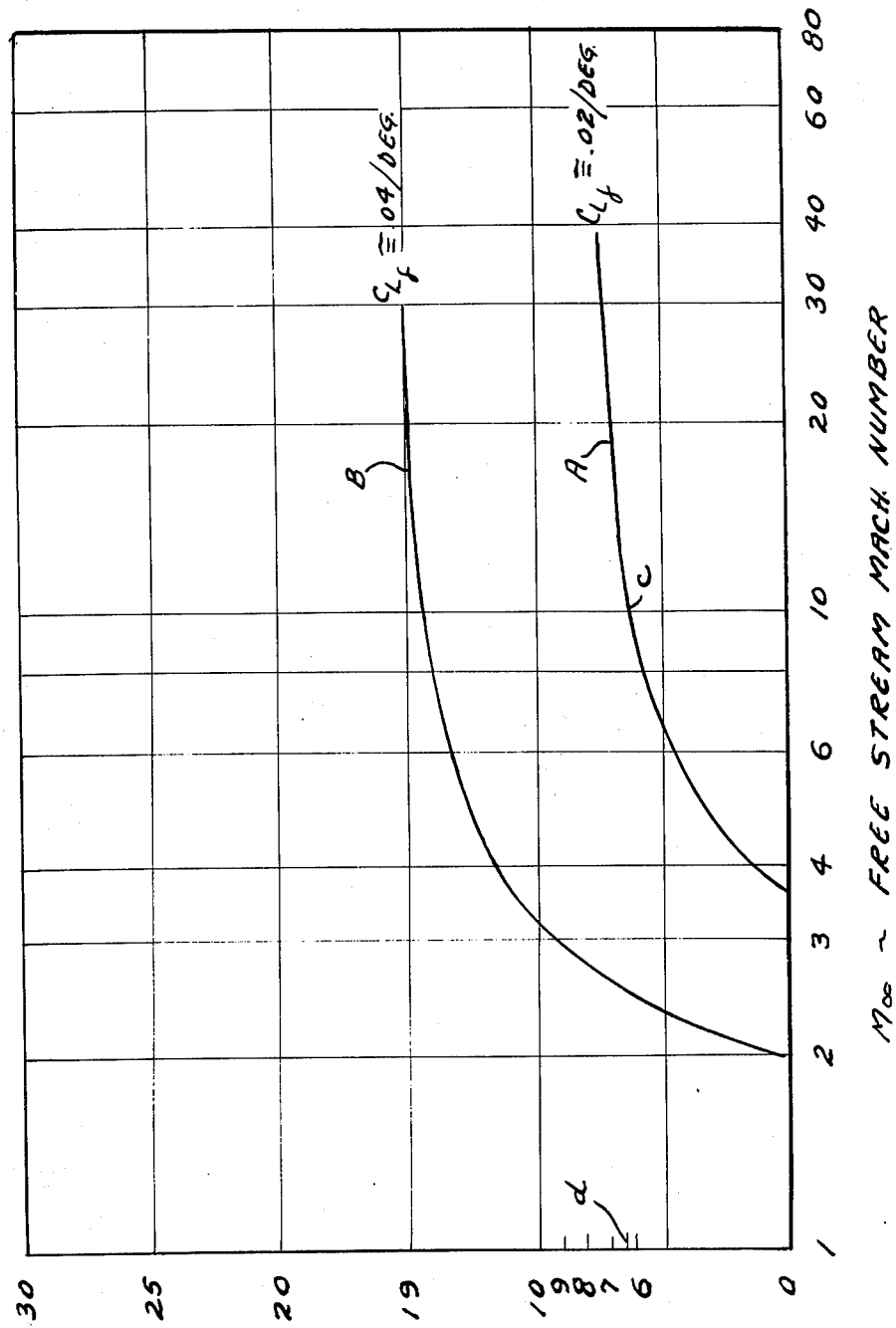
FIG. 2 is a graph plotting the variation in the wedge angle of the inventive airfoil of FIG. 1 against Mach number.

Referring generally to the drawings and, in particular, to FIG. 1 thereof, the new and novel in-flight, variable geometry and wedge-shaped airfoil of the present invention is indicated generally at 10 as including a first, relatively short, solid leading edge segment 11 incorporating the leading edge of the airfoil at 11a, and a second relatively long, hollow, main airfoil segment, indicated generally at 12 as including an upper airfoil surface 13, and a lower airfoil surface 14, both upper and lower airfoil surfaces 13, 14 being uniquely and individually adjustably mounted at their forward ends to the aft end of the leading edge-airfoil segment 11, as for example by appropriate and separate hinges indicated in somewhat schematic form at the reference numerals 15 and 16 and which may be of any appropriate typical, conventional or standard form, as desired. Of course, since the overall configuration of the present airfoil is a wedge-shaped, upper and lower airfoil surfaces 13 and 14, naturally diverge away from their hinges at 15, 16 to respectively terminate in aft ends that may be interconnected in a predetermined spaced apart relation to each other, the degree of which separation depending on their length and the particular angle of wedge existing between the said upper and lower airfoil surfaces 13, 14 when the latter are disposed in their neutral or normal airfoil position, as illustrated in the aforementioned FIG. 1. The specific interconnecting means between the said upper and lower airfoil surface-aft ends consist in an interconnecting hinge device, indicated generally at 17 as incorporating a pair of relatively short hinge arms, at 18 and 19, hinged or pivoted to each other at their inner ends at the centrally-disposed hinge or pivot point 20 and at their outer ends to the corresponding aft ends of the airfoil surfaces 13, 14 at the pivot or hinge points indicated respectively at the outer hinge or pivot points 21 and 22. A flexible-type of base cover element of an arcuate configuration, as denoted at 23, is used to enclose the rear ends of the said upper and lower airfoil surfaces 13 and 14 and thereby provide what is, in effect, the trailing edge of the inventive airfoil 10. Said base cover element 23, along with the aft end-hinge device 17, in addition to providing a positive and relatively stable interconnecting support to the aft ends of the said airfoil surfaces 13, 14, also provide a very positive restraint or, more accurately, a definite constraining means to limit the outward or extension movement of one of the other or both of the said airfoil surfaces 13, 14 relative to each other so that a greater than the intended deflection of the said airfoil surfaces, at least at the design maximum wedge angle, may not occur through any inadvertent action.

To achieve the desired alteration of the forces and movements being experienced by an aircraft moving particularly at greater than supersonic speeds, the above-referred to upper and lower plane, flat airfoil surfaces 13 and 14 may be deflected, either individually or collectively, a measured degree to accomplish the desired result either by varying the wedge angle existing between both airfoil surfaces 13, 14 or half-wedge angle existing between one of the surfaces 13, 14 and the airfoil longitudinal axis or center line. In this connection, it is to be noted that the inventive airfoil 10 may be used in any of the tail surfaces of the aircraft to include the horizontal or vertical stabilizer, the rudder and elevators. It also may be used as the main lifting surface or the wing of the aircraft. Similarily, the airfoil 10 of the present invention is equally applicable to provide either or both of the control and stabilizing means on spacecraft, missiles and other high speed vehicles. Thus, where the airfoil 10 would be applied to one of the aircraft tail surfaces, such as the rudder, while operating at relatively low angles of attack for the purposes of acting as a stabilizing device or, alternatively, as a trim device or trim tab, one or the other of the airfoil surfaces 13 or 14, depending on which surface is appropriated, may be retracted, or, in other words, adjusted inwardly to a shielded position, as seen, for example, in the phantom line position of FIG. 3, to thereby decrease the amount of airfoil surface area being exposed to the free stream flow. The latter operation of retracting the airfoil surface, as at 13 or 14, that is positioned on the appropriate side of the stabilizing or control device utilizing the invention uniquely results, as taught by the present invention, in a significant reduction in both trim drag by effecting less surface area exposure to the free stream flow, and an alleviation of aerodynamic heating by ensuring a reduction in heat transfer through to the retracted airfoil surface. Also, where both airfoil surfaces 13 and 14 are to be adjusted together, as for example where the inventive airfoil 10 is being used, in still another application thereof, as the main lifting device or wing of the aircraft so that both of the airfoil surfaces 13, 14 would be exposed to the free stream flow, the said surfaces 13 and 14 may be deflected inwardly together from their normal, unadjusted position of FIG. 1, to thus achieve a specifically controlled alteration of the pressure distribution on their respective surfaces, enabling the required trim control of the aircraft without an accompanying increase either in the retardation (drag) force or aerodynamic heating that would otherwise occur but for the use of the inventive variable geometry airfoil 10. The plot shown in FIG. 2 provides support for the proposition that by using the novel variable geometry airfoil 10 either for a high speed stabilizer, control and trim device or as the main lifting surface (wings) itself, the wedge angle thereof, that is, the angle existing between the upper and lower airfoil surfaces 13 and 14, may be quite easily varied in accordance with the Mach number for any particular design. Thus, as is evidenced from the plot of the foregoing FIG. 2, by utilizing the present variable wedge angle-airfoil 10, there is uniquely offered the capability of enabling the continuous or substantially continuous adjustment in flight of the lift-curve slope near zero angle of attack, $C_{L \alpha\, o}$, so as to allow both the stability and drag to vary as required at Mach numbers below the maximum design Mach number, because the adjustable wedge angle feature of the present device allows the use of a reduced airfoil surface area required to be exposed during operations while still delivering the stabilizing or control force needed for a particular operation. Thus, by the use of the graph of the aforementioned FIG. 2, which includes a plot of two lift curve slopes at A and B, for a Mach number equal to 10, for example, along the ordinate as indicated at the point C on the curve A, a deflection or wedge half angle of a valve of 6.5° may be selected from the abscissa, as denoted at the point d. Various other such angles of deflection or wedge half angles for adjusting the inventive airfoil 10 may be rather easily selected from the FIG. 2 graph and utilized to produce the correct adjustment for the said airfoil 10 at various Mach numbers to which the aircraft or other vehicle using the inventive airfoil may be accelerated during a particular flight mission. In this manner, the new and improved airfoil 10 clearly provides the inherent capability of greatly facilitating the alteration of the forces and moments experienced by an aircraft or other vehicle moving at relatively high speeds and, in particular, at greater than Mach 1 speeds, merely by adjusting the wedge or wedge-half angle of the said airfoil 10 to thhat precomputed for a particular Mach number and phase of flight operations.

To adjust the wedge angle or wedge half angle between each of the deflectable, upper and lower airfoil surfaces 13, 14 of the present airfoil 10, a separate hydraulic actuator, as denoted at the areas indicated generally at 24 and 25 (FIGS. 1 and 3), may be separately enclosed within an individual housing or, alternatively located within a common hydraulic actuator housing, as at 26, which common housing 26 may be fastened to a cantilevered rod or beam 27 suitably fixed within and to the structure of the airfoil 10, as desired. A fastener is used, as at 28 and 29, for each of the airfoil surfaces 13 and 14, to respectively restrain the outer end of a separate push-pull rod, as seen at 30 and 31, being respectively operable by the hydraulic actuators 24 and 25. The inner ends of the said push-pull rods 30, 31 are, of course, attached to the corresponding hydraulic actuator. Thus, by operating one or the other or both of the said hydraulic actuators 24, 25, the push-pull rod 30, 31 corresponding thereto may be likewise separately or collectively actuated either inwardly or outwardly, as desired for the particular flight condition, to selectively depress or raise either one or the other or both of the airfoil-upper or lower deflectable airfoil surfaces 13, 14 to the particular wedge angle (where both surfaces are being adjusted together) or wedge-half angle (where only one surface is being adjusted) that may be required to achieve the desired increase in the lift effectiveness, while, simultaneously, reducing the stabilization or control surface area needed for a particular operation to be exposed to the free stream flow with a resultant significant decrease in both drag and aerodynamic heating at the retracted surface or surfaces. In this regard, it is noted that FIG. 1 depicts the neutral, nonadjusted position of the invention airfoil 10, whereas, FIG. 3 illustrates one of the airfoil surfaces; namely, airfoil surface 13 adjusted to a retracted position, depicted in phantom, as previously mentioned.

Thus, a new and improved variable geometry, wedge-shaped, high speed airfoil has been developed whereby the forces and moments experienced by a vehicle equipped with the novel airfoil of the present invention and moving at supersonic speeds may be rather easily altered in flight by the simple depression or extension of the inventive, separate and adjustably mounted airfoil surfaces 13 and 14. Although a hydraulic actuator in schematic form has been depicted as the means for adjusting the said airfoil surfaces, it is to be understood that other mechanical, electrical or fluidic means may be used without departing from the true spirit or scope of the invention as is set forth in the appended claims. Finally, although the foregoing disclosure is made with primary reference to an aircraft, it is to be understood that the invention, in addition to its application to the control and lifting surfaces of supersonic aircraft such as the B-1, X-15 type aircraft and perhaps the F-15, also has application to missiles and controllable reentry vehicles such as the space shuttle and high lift-to-drag ratio hypersonic vehicles.

I claim:

1. An in-flight, stabilizing/controlling surface for a high speed vehicle, consisting of a wedge-shaped airfoil assembly comprising: a relatively short, leading edge-airfoil segment encompassing a thin leading edge and a first pair of oppositely-disposed and fixedly-positioned, airfoil surfaces integrally incorporating and extending from said this leading edge in divergent relation thereto; and a relatively elongated and hollow, main airfoil segment having inherently built-in, force-altering means comprising a second pair of oppositely-disposed airfoil surfaces oriented as a natural extension and continuing the divergent relation of said first pair of oppositely-disposed airfoil surfaces to terminate in a relatively thick, trailing edge, said second pair of oppositely-disposed airfoil surfaces being pivotally mounted along a pivotal axis with said first pair of oppositely-disposed airfoil surfaces and being thereby made adjustable relative to said leading edge-airfoil segment between expanded and contracted positions further outwardly and inwardly of an initial, neutral, and non-adjusted position, and actuating means for individually and/or collectively adjusting, and thereby varying the angle between said second pair of oppositely-disposed airfoil surfaces in accordance with a precomputed value to various expanded and contracted positions and said actuating means specifically providing for the control and adjustment of the amount of surface area exposure of one or the other or both of the said second pair of oppositely-disposed airfoil surfaces to the free stream flow to that required for the particular stabilizing and/or controlling function and which results from the said precomputed wedge-angle value predetermined to be both most compatible with a given Mach number of flight and simultaneously minimizing the drag and aerodynamic heating being experienced.

* * * * *